United States Patent Office 2,897,147
Patented July 28, 1959

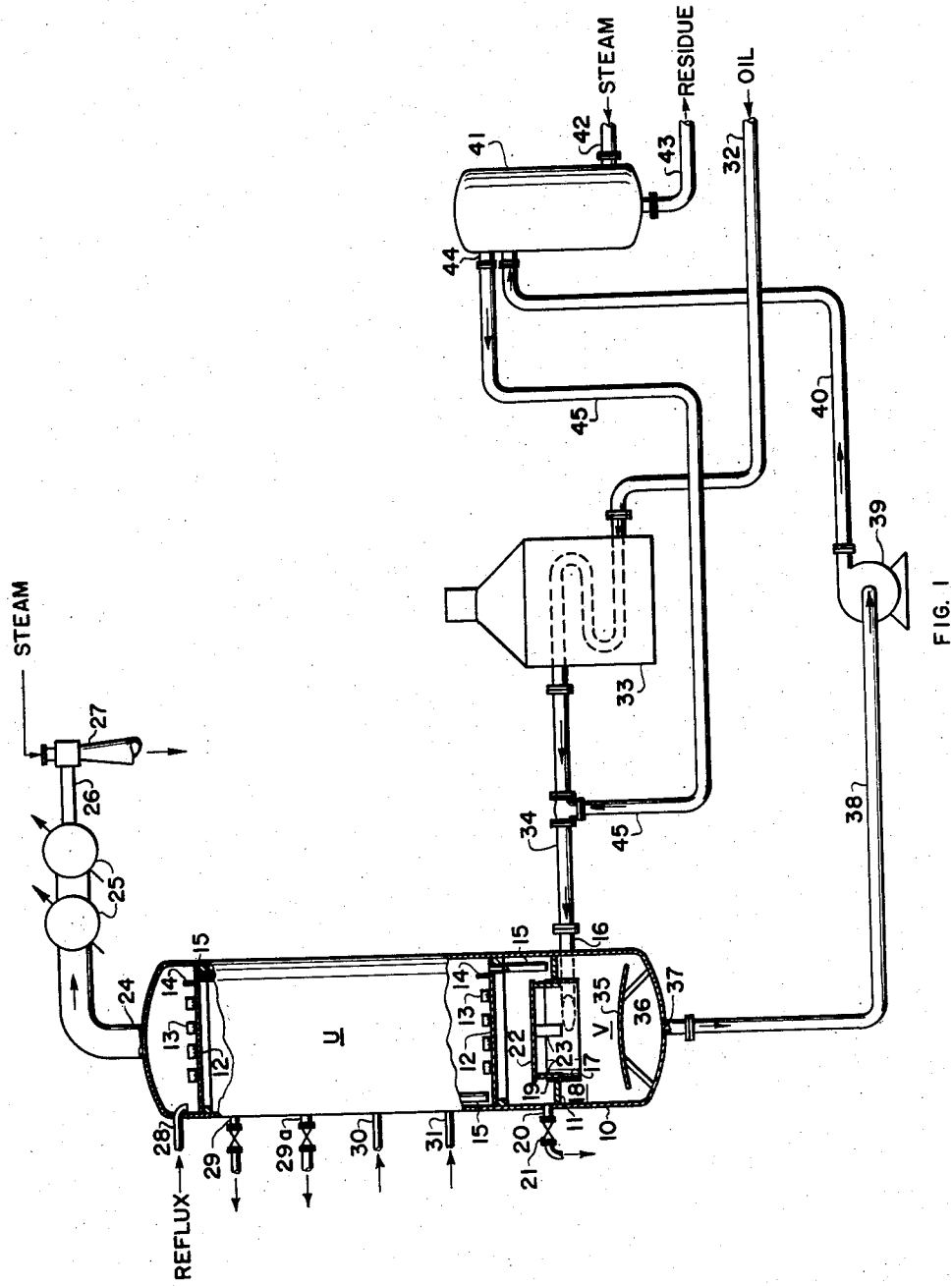

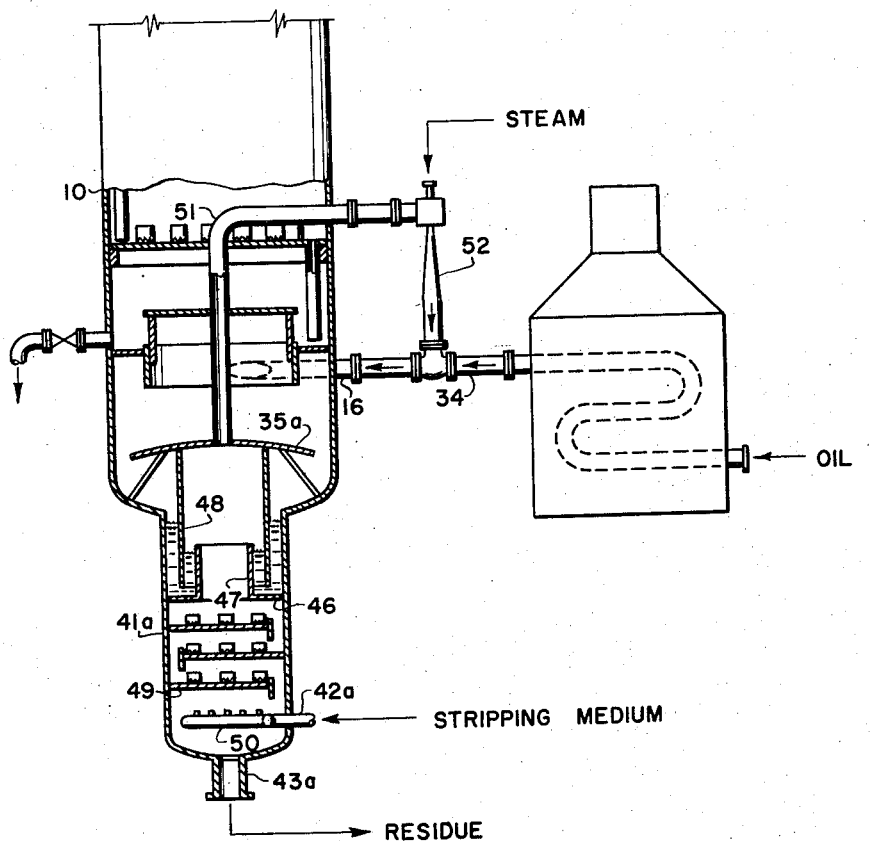

2,897,147

METHOD AND APPARATUS FOR DISTILLATION

Cornelis Lely and Willem Sebastiaan van der Laag, The Hague, Netherlands, assignors to Shell Development Company, New York, N.Y., a corporation of Delaware Application August 29, 1957, Serial No. 681,037

Claims priority, application Netherlands September 14, 1956

9 Claims. (Cl. 208—366)

This invention relates to the distillation of mixtures, such as hydrocarbon oils and the like, using a vortex chamber wherein a centrifugal separation occurs combined with stripping of the liquid from the centrifugal operation to remove a volatile product therefrom and the return of this product to the vortex chamber. It is particularly, although not exclusively, applicable to the distillation of hydrocarbon mixtures at reduced pressure wherein the vapor stream which is withdrawn from the vortex chamber through the overflow outlet is further rectified in a rectifying column.

It is known to distill at reduced pressure hydrocarbon mixtures, such as mineral oils and mixtures of vaporous and/or liquid hydrocarbons produced by heating these oils, especially the bottom product obtained in the distillation of crude oil at atmospheric or substantially atmospheric pressure. To this end the hydrocarbon mixture is led into a distillation column at a high temperature.

That fraction of the feed which is vaporous at the high feed temperature is rectified in the part of the distillation column situated above the feed inlet line, and withdrawn in two or more fractions as a side stream or top product, while the fraction which is liquid at the inlet temperature may be withdrawn directly for use as fuel or asphalt but may also be stripped with steam in a part of the column situated beneath the feed inlet line. On stripping asphalt is obtained as bottom product; the top products of the stripper, comprising steam, vaporous hydrocarbons and liquid entrained thereby, enter the top (rectifying) part of the column.

In order to improve the separation between the liquid and vaporous fractions of the feed, a vortex chamber may be arranged in the distillation column, and the feed to be distilled led into it tangentially. The vaporous fraction leaves the vortex chamber through the vapor overflow outlet and the liquid fraction flows through the liquid underflow outlet into the bottom (stripping) part of the column. A further improvement in the separation may be attained by arranging a central plate, for example a disc, in the bottom portion of the cylindrical part of the rotation space of the vortex chamber, which plate is completely free of the construction situated above it and of the inner wall of the chamber, in such a way that a free annular slot is present between the periphery of the disc and the inner wall of the vortex space (see Netherlands Patent No. 76,274).

Even with the use of these improvements according to prior practice it is, however, not possible to completely prevent liquid, which is still present in the top products of the asphalt stripper, from finding its way with them via the whirl chamber into the rectifying part of the distillation column. The presence of this liquid in the rectifying part of the distillation column impairs the purity of the fractions obtained in the rectification. This is especially disadvantageous, when these incompletely pure fractions are used as feed for catalytic cracking processes, as there is then a danger of the catalyst rapidly becoming unusable.

It has now been discovered that this difficulty may be eliminated while at the same time obtaining a number of practical advantages, by stripping the liquid which is separated in the vortex chamber in a stripper which is isolated from the vortex chamber and leading the top product from the stripper tangentially into the vortex chamber, preferably together with the main feed stream.

Accordingly, the invention relates to a process and apparatus for the distillation of mixtures, such as hydrocarbon mixtures at reduced pressure, wherein the mixture to be distilled is admitted tangentially into a vortex chamber and therein separated by centrifugal force into a vapor and a liquid fraction, the former being discharged through the vapor overflow outlet and usually rectified, and the latter being discharged through the liquid underflow outlet and stripped with a gaseous stripping medium, such as steam. Now the improvement according to the invention resides in passing the discharged liquid into a stripper which is isolated from the vortex chamber against the direct return flow of fluid into the chamber, e.g., by using a separate stripping column which is connected by a pipe to the underflow outlet of the vortex chamber, or by passing the liquid from the underflow outlet through a liquid seal into a stripping column which is subjoined to the vortex chamber, and leading the top products of the stripper tangentially into the vortex chamber, preferably together with the main feed thereto. Liquid, e.g., asphalt, which is contained in the said top product is thereby centrifugally separated within the vortex chamber and is again returned to the stripper with the liquid discharged through the underflow outlet and is eventually discharged with the residue from the stripper. This entrained liquid is thereby prevented from entering the rectifying column together with the vapor fraction which is discharged through the overflow outlet. A further consequence of such recycle of the stripper top product is that the partial pressure of the constituents of the feed stream is reduced; thus, when distilling hydrocarbon oil and steam is admitted into the asphalt stripper, this steam is included in the top product and admitted into the vortex chamber.

Stated in another way, the invention provides an improvement whereby the vortex chamber is used not only to effect a primary separation of the feed stream into vapor and liquid but is also utilized to separate liquid material from the recycled stripper top product, whereby the vapor fraction from the vortex chamber is free from this liquid.

The process may be carried out in a variety of apparatus and two principal embodiments are described herein. In the first the stripping column is separate from the vortex chamber, the vapors from the vortex chamber being rectified in a fractionating column which is preferably mounted above the vortex chamber while the stripping column is mounted, for example, at the side of the vortex chamber. This permits the height of the unit to be reduced considerably, involving constructional advantages. If desired the stripping column may be integral with stripper columns for the treatment of fractions derived from the rectifier.

In the other embodiment the stripping column is constructionally integral with and beneath the vortex chamber and rectifier column, but is separated from the vortex chamber by a liquid seal though which no steam or other top products from the stripper can find their way directly into the vortex chamber. This embodiment is applicable particularly when an existing column having a subjoined stripping section is to be modified to conform to the present invention, such a modification being possible with relative ease.

The invention will be described further with reference to the accompanying drawing forming a part of this specification, wherein:

Figure 1 is a diagrammatic elevation view of the several columns and connections, the vortex chamber being shown in section; and Figure 2 is a fragmentary vertical sectional view showing a second embodiment.

Referring to Figure 1, the apparatus includes a shell 10 enclosing an upper rectifying section U (above the plate 11) and a vortex chamber V, at least the latter being circular in cross section. The section U, which forms a rectifying column, contains gas-liquid contacting trays of any suitable design, e.g., vertically spaced trays 12 provided with bubble caps 13, overflow weirs 14 and downcover passageways or ducts 15; however, the invention is not restricted to such trays and other contact means, such as grid or stamped trays with or without downcomers, or shower deck trays, may be used. The vortex section has one or more tangential inlet pipes 16 through which the mixture to be distilled is introduced just beneath the plate 11 in a direction to form a vortex about the vertical central axis. This plate forms the top of the vortex chamber and has any conventional or suitable opening for the upflow of vapor from the central part of the chamber into the rectifying column; thus, the plate 11 may have a large, central circular opening within which is mounted an overflow outlet tube 17 that extends downwards preferably to a level below the bottom edge of the inlet 16 to define an annular vortex space 18. When the plate 11 is to function as a liquid draw-off tray this ring also extends somewhat above the plate, to form an annular dam 19; liquid may then be drawn off through a pipe 20 having a valve 21. The top of the opening may optionally be covered by a circular plate 22 held in spaced relation to the ring by supports 23. The top of the rectifier is connected by a vapor outlet 24 to a series of condensers 25 and the condensate line 26 may be provided with one or more eductors 27 for evacuating the distillation column to lower the pressure. For example, the pressure within the vortex chamber may be reduced to 30 to 150 mm. of Hg absolute. Reflux liquid is admitted to the top of the rectifying column through a pipe 28 from any source, e.g., from the line 26 by suitable connections, not shown. Various cuts may be withdrawn from the rectifying column through lines represented at 29 and 29a, while portions of the withdrawn material and/or treating agents may be admitted or re-admitted at suitable levels, e.g., through a pipe 30 or 31.

The hydrocarbon mixture to be distilled is supplied via a feed line 32 through a furnace 33, wherein it is heated to a suitable temperature, e.g., 650 to 760° F., and from where it flows through a pipe 34 into the vortex chamber through the tangential inlet 16 as the main feed stream. The vortex chamber preferably contains a central separator plate 35 mounted in spaced relation below the open, lower end of the tube 17 and within the centrifugation space, by means of supports 36. The periphery of this plate is spaced from the chamber wall to permit liquid to descend to the underflow outlet 37. This outlet is connected to a transfer pipe 38 having a pump 39 for delivering the liquid via a pipe 40 to the top of a separate stripping column 41. The latter contains suitable contacting elements, not shown, such as the trays described for the rectifier, and has a steam inlet pipe 42 by which stripping steam is admitted, a residue outlet 43, and a top-product outlet 44. The outlet 44 is connected by a recycle conduit 45 to the pipe 34 for introducing the top product tangentially into the vortex chamber together with the main feed stream.

In operation the main feed stream, e.g., residual hydrocarbon oil which may already be partly vaporized upon leaving the furnace 33, is further vaporized upon entering the low-pressure vortex chamber through the tangential inlet 16. Here it is separated by centrifugal force into a vapor fraction, which is concentrated at the central part of the chamber and flows upwards through the overflow tube 17 into the rectifying column, and a liquid fraction which collects at the chamber wall and descends about the periphery of the plate 35. The liquid, which may consist mainly of asphalt, flows from the underflow outlet 37 via the pipes 38 and 40 to the stripping column 41, wherein it is stripped with steam admitted at 42. The temperature in this stripper will generally be somewhat lower than that in the vortex chamber, while the pressure is usually higher. The stripped asphalt is discharged at 43. Steam and stripped volatiles, constituting the top product, are discharged at 44 and, after flow through the recycle conduit 45, enter the vortex chamber tangentially through the inlet 16. Any liquid contained in the said top product is separated from the vapor by centrifugal action and returns to the stripper via the underflow outlet 37.

In the embodiment shown in Figure 2, the vortex chamber and rectifying column may be constructed as previously described, and a heated feed stream is similarly introduced from a furnace from a pipe 34 through the inlet 16. In this arrangement, however, the stripper 41a is constructionally integral with the shell 10 and contains an annular plate 46 having an upstanding flange 47 to form a gutter for the collection of liquid which descends from the vortex chamber. A chimney 48 is sealed to the bottom of the separator plate 35a and extends into the gutter. The stripper contains contacting trays 49 and a sparger 50 to which a gaseous stripping medium, such as steam, is supplied from the inlet pipe 42a, and is provided with a residue outlet 43a.

The plate 35a has a central opening forming a topproduct outlet which is connected to a recycle conduit 51 leading to the inlet pipe 34. Any suitable means for inducing flow may be provided; for example, the conduit 51 may be led into the pipe 34 through an eductor 52 and/or a higher pressure may prevail in the stripper.

In operation, the liquid seal in the gutter formed by the plate 46, flange 47 and chimney 48 permit liquid to enter the top of the stripping column but prevent the direct entry of steam or other top products into the vortex chamber. The top product, therefore, ascends the chimney 48 and flows through the recycle conduit 50 into the vortex chamber through tangential inlet 16 for centrifugal separation as was previously described. When the pressure in the stripping column 41a exceeds that in the vortex chamber the eductor 52 is not required; in this case the liquid level in the annular space between the column wall and the chimney 48 is higher than the top of the flange 47, as shown.

We claim as our invention:

1. In a process for distilling a hydrocarbon mixture at sub-atmospheric pressure wherein the hydrocarbon mixture to be distilled is passed as a feed stream tangentially into a confined vortex zone and separated therein by centrifugal action into a vaporous fraction and a liquid fraction, the vaporous fraction is discharged from said vortex zone and rectified, and the liquid fraction is stripped with steam, the improvement which comprises withdrawing the said liquid fraction from the vortex zone, steamstripping the withdrawn liquid fraction in a stripping zone which is isolated from said vortex zone by introducing steam into the stripping zone and producing an overhead top product and a residue, withdrawing said top product from the stripping zone, and introducing the withdrawn top product tangentially into said vortex zone.

2. A process according to claim 1 wherein said top product is introduced into the vortex zone together with said hydrocarbon feed stream.

3. Apparatus for the distillation of a mixture comprising: walls enclosing a vortex chamber, said chamber having a tangential side inlet for the admission of a heated feed stream to be distilled, a vapor overflow outlet and a liquid underflow outlet at the bottom; a rectifying column connected to said overflow outlet to receive vapor therefrom; a stripping column having a feed inlet connected to said underflow outlet to receive liquid from the said chamber, said stripping column having a top-product outlet and a residue outlet; and recycle conduit means connecting said top-product outlet to the vortex chamber disposed to introduce the top product from the stripping column tangentially into the vortex chamber, said stripping column being isolated from the vortex chamber against the passage of fluid into the latter except through said recycle conduit means.

4. Apparatus according to claim 3 wherein said recycle conduit means is connected to the said tangential inlet for the combined admission of the feed stream and top product through the said tangential inlet.

5. Apparatus according to claim 3 wherein said stripping column includes means for admitting a gaseous stripping medium into a lower part thereof, whereby said top product contains the stripping medium and volatile constituents of the liquid withdrawn through the underflow outlet.

6. Apparatus according to claim 3 wherein said overflow outlet includes a central, coaxial tube which is open at the bottom and extends out through the top of the vortex chamber, the said recycle means being disposed to admit the top product into the vortex chamber at a level above the bottom of said tube.

7. In combination with the apparatus according to claim 6, a horizontal separator plate mounted within said vortex chamber beneath said tube and above the underflow outlet, said plate extending over the central part of the chamber and providing a passage for the downflow of liquid near the side of the chamber.

8. Apparatus for the distillation of a hydrocarbon mixture comprising: walls enclosing a vortex chamber, said chamber having a tangential side inlet for the admission of a heated hydrocarbon feed stream to be distilled, a central vapor overflow outlet tube which is open at the bottom situated within said chamber and extending out at the top thereof and a liquid underflow outlet at the bottom; a separate stripping column having an inlet, means to admit steam into a lower part thereof, a top-product outlet and a residue outlet; conduit means for flowing liquid from said underflow outlet to the inlet of the stripping column; and recycle conduit means connecting said top-product outlet to the vortex chamber disposed to introduce the top product from the stripping column tangentially into the vortex chamber at a level above the bottom of said overflow outlet tube.

9. Apparatus for the distillation of a hydrocarbon mixture comprising: walls enclosing a vortex chamber, said chamber having a tangential side inlet for the admission of a heated hydrocarbon feed stream to be distilled, a central vapor overflow outlet tube which is open at the bottom situated within said chamber and extending out at the top thereof, and a liquid underflow outlet at the bottom; a stripping column joined to the bottom of said vortex chamber having means to admit steam into a lower part thereof and a residue outlet; a separator plate mounted within the vortex chamber beneath said overflow outlet tube and the underflow outlet and extending over the central part of the chamber, said plate providing a passage for the downflow of liquid near the side of the chamber, means for providing a liquid seal between said underflow outlet and the top of the stripping column to permit the entry of liquid into the column but preventing the passage of fluid from the column into the vortex chamber; and recycle conduit means interconnecting the top of the stripping column tangentially to the vortex chamber at a level above the bottom of said overflow outlet tube.

No references cited.